United States Patent [19]

Stinson

[11] Patent Number: 4,784,406
[45] Date of Patent: Nov. 15, 1988

[54] FRICTION REDUCING AUTOMOTIVE SUSPENSION STABILIZER BAR

[75] Inventor: Jonathan D. Stinson, Plymouth, Mich.

[73] Assignee: Ford Motor Company, Dearborn, Mich.

[21] Appl. No.: 110,828

[22] Filed: Oct. 21, 1987

[51] Int. Cl.[4] .............................................. B60G 15/00
[52] U.S. Cl. .................................... 280/665; 280/689; 280/700; 280/723
[58] Field of Search ............... 280/664, 689, 700, 721, 280/723, 665

[56] References Cited

U.S. PATENT DOCUMENTS

| | | | |
|---|---|---|---|
| 2,660,449 | 11/1953 | MacPherson | 280/665 |
| 2,961,253 | 11/1960 | Allison | 280/689 |
| 3,181,885 | 5/1965 | Baracos et al. | 280/723 |
| 3,733,087 | 5/1973 | Allison | 280/664 |
| 4,066,278 | 1/1978 | Takagi | 280/710 |
| 4,143,887 | 3/1979 | Williams et al. | 280/697 |
| 4,153,272 | 5/1979 | Fiedler et al. | 280/689 |
| 4,615,537 | 10/1986 | Damon | 280/668 |
| 4,632,423 | 12/1986 | Tanahashi | 280/689 |
| 4,648,620 | 3/1987 | Nuss | 280/689 |

OTHER PUBLICATIONS

*Ford Motor Company Shop Manual for 1968 Model Taurus and Sable Automobiles*, pp. 14-32-1 and 14-32-6.

*Primary Examiner*—Kenneth R. Rice
*Attorney, Agent, or Firm*—Jerome R. Drouillard; Roger L. May

[57] ABSTRACT

A friction reducing automotive suspension stabilizer bar includes a combination torsional and bending reaction segment running generally transversely across the vehicle and pivotally mounted to the chassis of the vehicle and left and right crank arms with each having a first end attached to the torsional and bending reaction segment and a second end adapted to be attached to a telescoping strut. Bearing means are provided for attaching each of the second ends of the stabilizer bar to the inboard side of a telescoping strut such that the torsional and bending reaction segment of the stabilizer bar will react to both torsional loading resulting from jounce and rebound movement of the suspension as well as to bending loads resulting from transversely directed forces imposed upon the second ends of the crank arms by the telescoping struts.

14 Claims, 3 Drawing Sheets

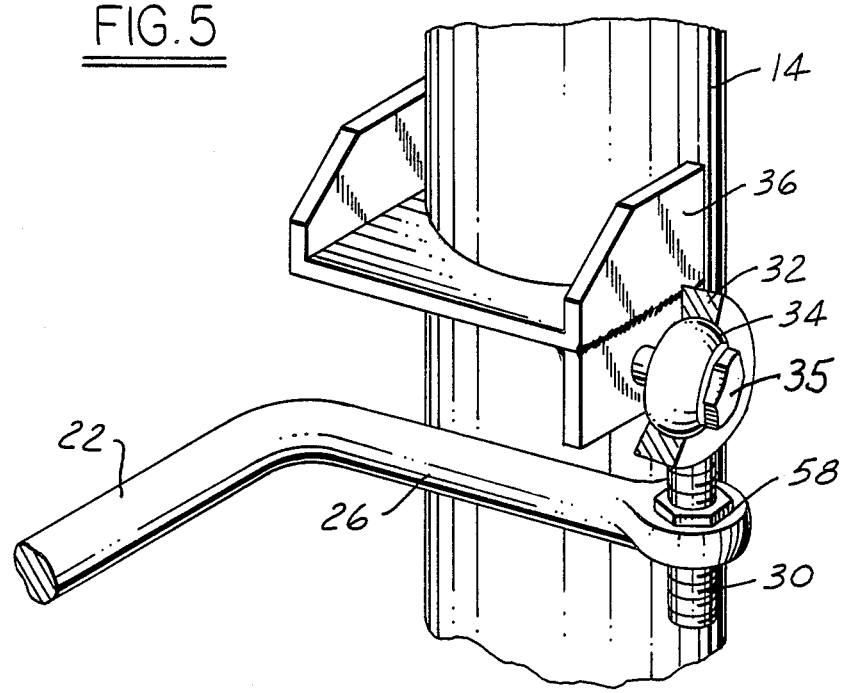
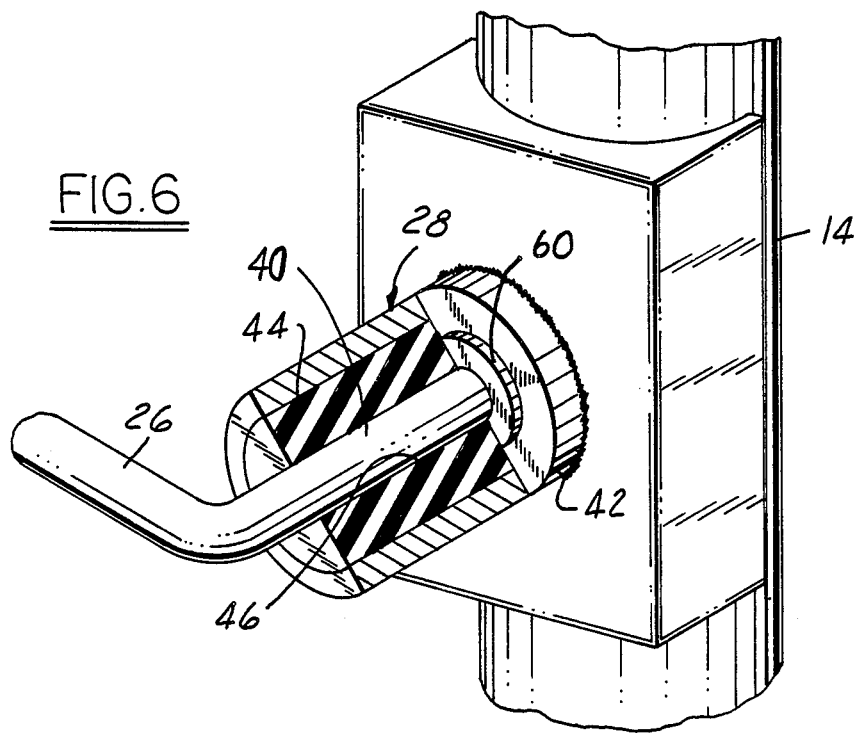

FRICTION REDUCING AUTOMOTIVE SUSPENSION STABILIZER BAR

BACKGROUND OF THE INVENTION

1. Field of the Invention

This invention relates to a friction reducing stabilizer bar for an automotive vehicle.

2. Description of Related Art

Torsional stabilizer bars have proven useful in vehicles for many years. Such stabilizer bars commonly employ a transverse torsion bar segment pivotally attached to the vehicle chassis and leading or trailing longitudinal segments attached to a control arm, wheel carrier or telescoping strut. Examples of stabilizer bars having this particular configuration are shown in U.S. Pat. Nos. 2,660,449; 3,181,885; 3,733,087; 4,066,278; 4,143,887. Ford Motor Company Shop Manual for 1986 model Taurus and Sable automobiles at pages 14-32-1 and 14-32-6 shows a further example of the conventional stabilizer bar in which each free end of the stabilizer bar is attached to the inboard side of a MacPherson strut by means of a link equipped with a rubber bushing at either end.

Each of the previously mentioned stabilizer bar systems acts in a manner such that when the vehicle body tries to roll in relation to the suspension system during a turning maneuver, the added load caused by centrifugal force acting upon the wheel at the outside of the corner is partially transferred to the wheel at the inside of the corner, with the result that excessive body roll is prevented.

Designers have sought to enhance the function of stabilizer bars in several ways. U.S. Pat. No. 4,648,620, which is assigned to the assignee of the present invention, discloses an adjustable stabilizer bar in which the torque reactive capacity of the primary torsional reaction segment is adjustable. U.S. Pat. No. 4,153,272 discloses a stabilizer bar assembly in which the lever arms of the stabilizer bar are pivotally connected to the steering knuckles by means of links such that the lever arm at the inside of the turn is moved downwardly by a steering-related force transmitted by way of the respective connecting link, whereas the lever arm at the outside of the turn is moved upwardly. Finally, U.S. Pat. No. 4,632,423 discloses a stabilizer bar system in which the crank ends of the stabilizer bar attach to a telescoping suspension strut by means of a link equipped with a ball joint at either end.

One of the drawbacks inherent with MacPherson strut and other types of telescoping strut suspensions is that friction developed within the strut due to the bending moment resulting from wheel loading may cause undesirable ride characteristics. This undesirable characteristic stems from the fact that friction within the strut necessitates that a fairly high level of force be input to the strut merely to begin telescoping the strut in the jounce or rebound direction. Accordingly, it is desirable to reduce friction within the strut, by reducing the bending load that adds to strut friction.

One commonly employed means for reducing the undesirable bending load within a telescoping strut is shown in previously mentioned U.S. Pat. No. 4,632,423, in which the lower spring seat of a MacPherson strut is offset to the outboard side of the vehicle. This arrangement is somewhat disadvantageous because the offset position of the suspension spring increases the package dimensions of the final suspension, at the expense of interior spaciousness of the automobile. U.S. Pat. No. 4,615,537, which is assigned to the assignee of the present invention, discloses yet another means for altering friction of a telescoping strut. As set forth in the '537 patent, the operating friction of a strut may be reduced by rotating either or both ends of the strut outward with respect to the balance of the strut. This system produces only a fixed reduction in strut friction because the magnitude of the force tending to reduce the friction is fixed at the time the strut is rotated outward by the wedge or other device shown in the '537 patent.

The present invention offers a means for reducing friction within telescoping struts not only statically, that is when the struts are not moving in the telescoping jounce and rebound directions, but also in a dynamic fashion.

It is an advantage of the present invention that a stabilizer bar according to this invention will reduce friction within the telescoping struts of a suspension.

It is yet another advantage of the present invention that a stabilizer bar according to this invention may be utilized without the need for additional attaching links.

It is yet another advantage of the present invention that a stabilizer bar according to this invention will reduce vehicular noise resulting from road imperfections.

It is yet another advantage of the present invention that a stabilizer bar according to this invention will have an operating characteristic such that as the wheels of the vehicle go into the jounce position the stabilizer bar will exert force against the telescoping struts of the suspension in a direction tending to minimize friction within the telescoping struts. This force will automatically decrease as the vehicle moves in the direction of the normal ride height.

SUMMARY OF THE INVENTION

According to the present invention, a friction reducing suspension stabilizer bar and attachment means for a vehicle with telescoping struts comprises a combination torsional and bending reaction segment running generally transversely across the vehicle and pivotally mounted to the chassis of the vehicle and left and right crank arms with each having a first end attached to the torsional and bending reaction segment of the stabilizer bar and a second end adapted to be attached to a telescoping strut. A friction reducing stabilizer bar and attachment means according to the present invention further comprises bearing means for attaching each of the second ends of the left and right crank arms to separate telescoping struts such that the torsional and bending reaction segment will react to both torsional loading resulting from jounce and rebound movement of the suspension and to bending loads resulting from transversely directed forces imposed upon the second ends of the crank arms by the telescoping struts.

A suspension stabilizer bar according to the present invention may include a unitary torsional and bending reaction segment and crank arms.

A bearing means comprising a portion of a suspension stabilizer bar and attachment system according to the present invention comprises a combination thrust and rotation bearing adapted for receiving one of the second ends of the stabilizer bar crank arms connecting the second end of the stabilizer bar to an inboard portion of a telescoping suspension strut. The bearing may comprise a ball and socket joint with one of the second ends of the crank arms attached to the ball portion of the joint.

The second ends of the crank arms, which are attached to the bearing means, may comprise a stub section extending generally perpendicular to the remainder of the crank arm and generally parallel to the combination torsional and bending reaction segment. If such a stub section is employed according to the present invention, the stub section will be engaged with one of the previously mentioned bearing means.

BRIEF DESCRIPTION OF THE DRAWINGS

FIG. 5 is similar to FIG. 4 but shows a spherical rod end bearing for attaching a stabilizer bar to a telescoping strut according to the present invention.

FIG. 6 is similar to FIGS. 4 and 5, but shows a rubberized socket bearing for attaching a stabilizer bar to a telescoping strut according to the present invention.

DESCRIPTION OF THE PREFERRED EMBODIMENTS

As shown in the various figures, the present invention is concerned with a stabilizer bar and mounting system for an automotive vehicle. This stabilizer bar functions not only in the manner of a traditional torsional stabilizer bar, but also as a bending reaction member capable of reducing the operating friction of telescoping struts to which the stabilizer bar is attached and further capable of transferring impact loading from one suspension strut to the other of a pair of suspension struts.

Figure 1:
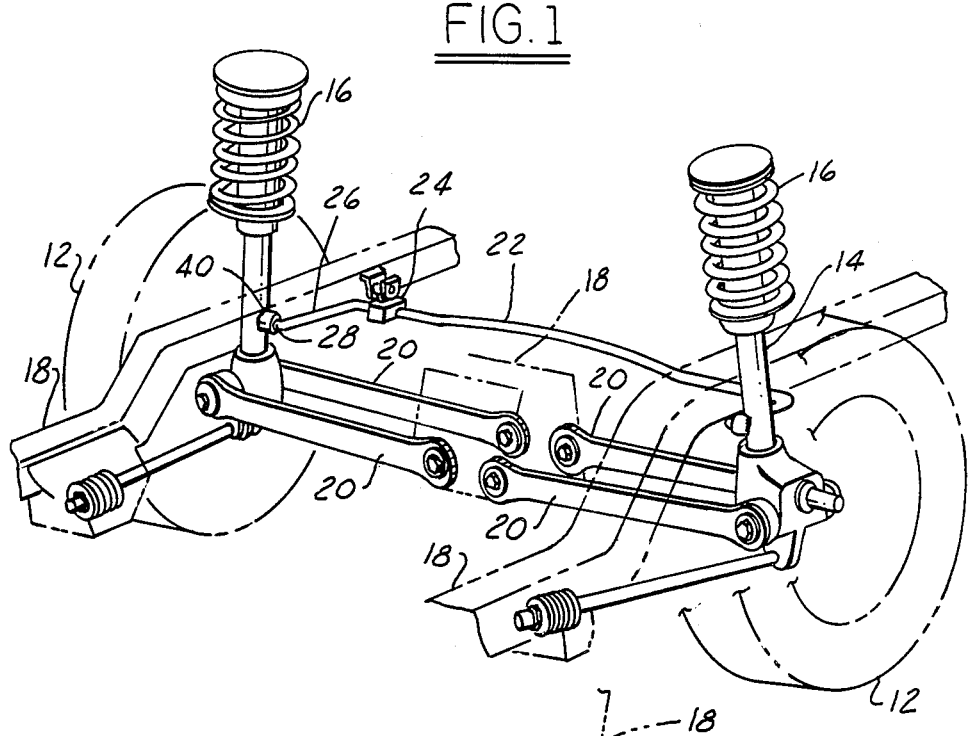
FIG. 1 is a perspective view of an automotive suspension including a stabilizer bar system according to the present invention.
Figure 2:
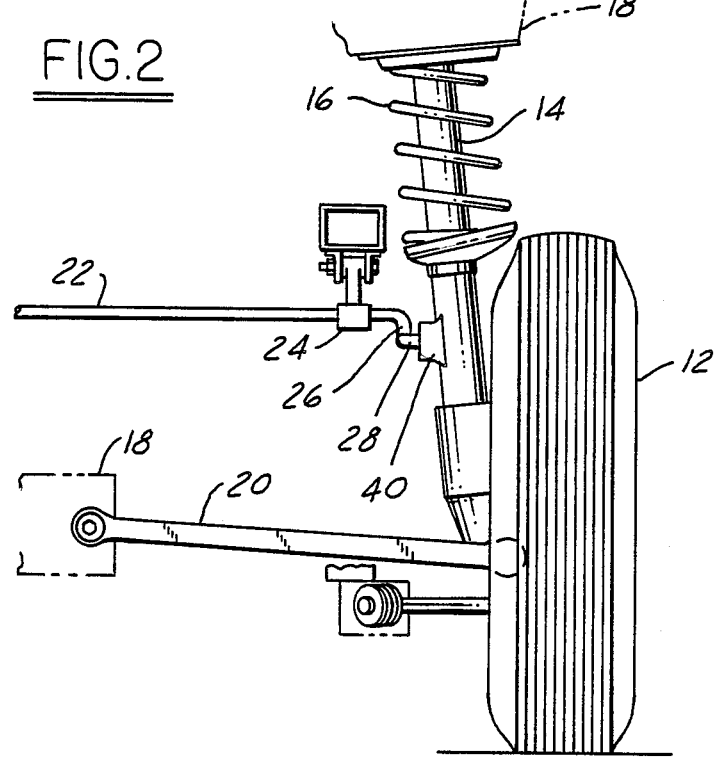
FIG. 2 is a frontal elevation of one-half of the suspension shown in FIG. 1.

In a preferred embodiment shown in FIGS. 1 and 2, road wheels 12 are rotatably mounted upon MacPherson struts 14. The upper ends of the MacPherson struts are mounted to chassis 18 of the vehicle (FIG. 2). Those skilled in the art will appreciate in view of this disclosure that although a full MacPherson strut having spring 16 is illustrated in FIGS. 1 and 2, a stabilizer bar system according to the present invention may be used with not only a full MacPherson strut with the suspension spring concentrically mounted about the strut, but also with so-called modified MacPherson struts where the spring is mounted not upon the strut itself but upon a control arm. Further, a system according to the present invention may be usefully employed with a full MacPherson strut having an air spring instead of the illustrated steel coil spring. Finally, a system according to this invention may be employed with yet other suspension arrangements including those in which a transverse leaf spring is utilized as both a spring element and a transverse control arm.

The lower ends of the MacPherson struts shown in FIGS. 1 and 2 are pivotally attached to control arms 20 which are in turn attached to the chassis of the vehicle in accord with conventional practice.

Figure 3:
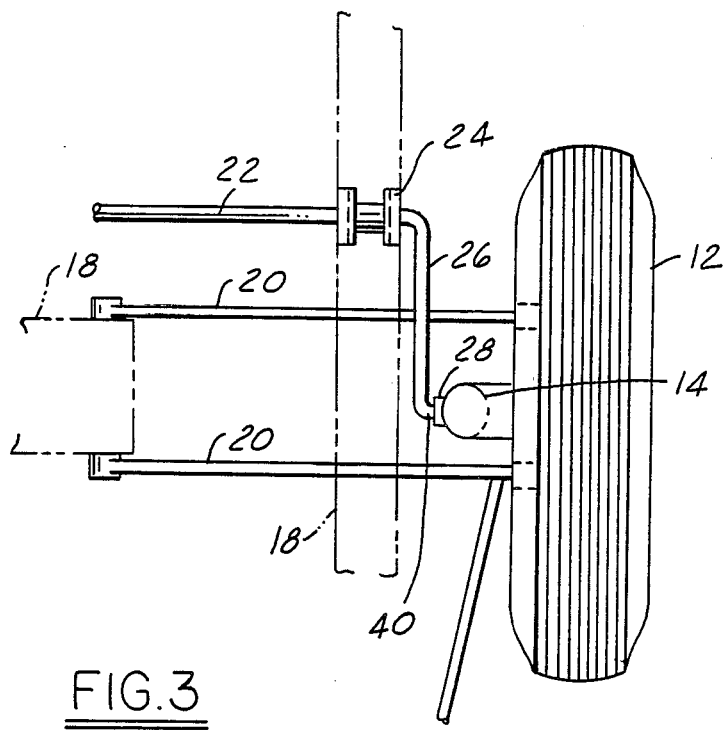
FIG. 3 is a plan view of the stabilizer bar system shown in FIGS. 1 and 2.

The stabilizer bar shown in the various figures comprises a combination torsional and bending reaction segment 22 which lies generally transverse of the vehicle and is pivotally mounted to the vehicle by means of bearings 24 (FIGS. 2 and 3). These bearings may comprise conventional elastomeric isolators maintained in contact with the stabilizer bar and with the chassis of the vehicle by conventional bracketry, or they may comprise other mounting arrangements known to those skilled in the art. In any event, the function of the stabilizer bar mounting bearings 24 is to allow both rotational movement of the stabilizer bar about its major access as well as incidental non-rotational movement arising from the bending and thrust reactions imposed upon the stabilizer bar by telescoping struts 14.

Combination torsional and bending reaction segment 22 is joined to and unitary with crank arms 26 which lie at either end of segment 22. Each crank arm shown in FIGS. 1, 2, 3, 4 and 6 has a stub end 40 engaged with a bearing means 28. The function of bearing means 28 is to attach the second ends of crank arms 26 to telescoping struts 14 so that combination torsional and bending reaction segment 22 will react to both torsional loading resulting from jounce and rebound movement of the suspension and to bending loads resulting from transversely directed forces imposed upon the stub ends of the crank arms by telescoping struts 14.

Figure 4:
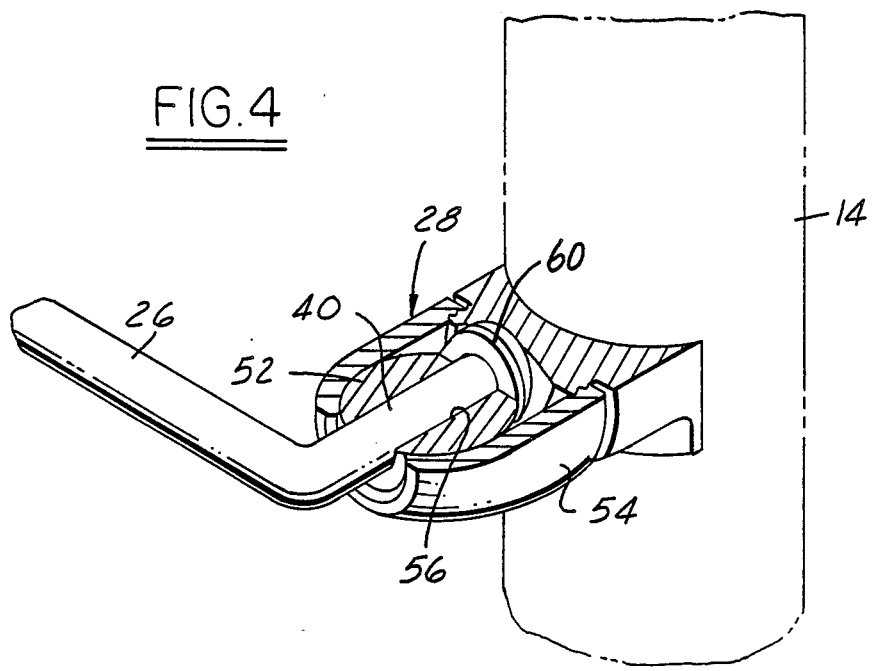
FIG. 4 is a perspective view showing a ball joint bearing for attaching a stabilizer bar to a telescoping strut according to the present invention.

The details of construction of bearing means 28 are shown in FIGS. 4 and 6. In the embodiment shown in FIG. 4, stub end 40 of the stabilizer bar is engaged with bore 56 formed within ball 52 contained within a ball joint. Socket 54 of the ball joint is mounted to the inboard side of strut 14.

In the embodiment of FIG. 6, each of the stub sections extending generally perpendicular to the remainder of the crank arm and generally parallel to combination torsional and bending reaction segment 22 is engaged with bore 46 formed within the elastomeric insert 44 carried within socket 42. In turn, socket 42 is mounted upon an inboard portion of strut 14. In each case, a thrust washer, 60, is imposed between the very end of stub section 40 and the remainder of bearing means 28.

In the embodiment shown in FIG. 5, threaded shank 30 of a spherical rod end is engaged with an eye formed in the end of a stabilizer bar crank arm 26. Outer housing 32 of the spherical rod end is attached to and integral with shank 30. The outer housing contains a ball insert 34 through which bolt 35 passes, thereby securing the spherical rod end to a bracket 36 which is mounted upon strut 14.

A stabilizer bar system according to the present invention functions as follows. In the event that one of road wheels 12 strikes an object in the road causing the wheel to move upwardly in the jounce direction, stabilizer bar section 22 will be loaded torsionally and this will cause the opposite wheel to be urged in the upward direction, thereby preventing excessive leaning of the vehicle's body. Similarly, in the event that the vehicle is driving in a curve, the wheel at the outside of the curve will be caused to move upwardly in the jounce direction and this again will cause the stabilizer bar to be loaded torsionally with a result that the wheel on the inside of the curve will be urged to move in the upward or jounce direction, again with the result that excessive leaning of the vehicle's body will be avoided.

Movement of the vehicle's road wheels in the jounce and rebound directions will be aided by the friction reduction produced by a stabilizer bar according to this invention because the stabilizer bar will be preloaded from one stub end to the other. More precisely, the stabilizer bar will be pushed inwardly by each telescoping strut 14, with the result that even when the vehicle is idling at curbside and neither of its roadwheels is moving in either the jounce or rebound directions, the stabilizer bar stub ends will press outboard against the telescoping struts. This outward thrust provided by the stabilizer bar assembly will help to minimize the friction developed within the telescoping struts. As is noted in the introduction to this document, telescoping struts are marked by an undesirable friction characteristic arising from the fact that the loading acting upwardly through the vehicle wheels is applied to the strut via the spindle, which acts as a lever arm to impose a bending moment on the strut. By pushing outwardly against the struts, a stabilizer bar according to the present invention will partially counteract this bending moment with the result that the struts will operate more easily at a lower friction level. As a result, the ride quality of the vehicle will be enhanced.

When a stabilizer bar system according to the present invention is loaded dynamically—i.e., when one or both of the wheels moves into the jounce direction, the stabilizer bar functions in a transverse mode as follows. First, if one wheel moves in the jounce direction the upward movement of the stabilizer bar stub will be in a direction, because of the converging angle between telescoping struts 14, such that the stub end and, indeed, the entire stabilizer bar, will be pushed transversely across the vehicle in the direction of the opposing telescoping strut 14. Accordingly, some of the loading due to the jounce movement which would otherwise be imposed upon the upper mounting of the telescoping strut will be shared by the opposing telescoping strut through the transverse movement of the stabilizer bar assembly. It has been found that a stabilizer bar assembly according to the present invention will assist materially in the reduction of noise produced by a MacPherson strut suspension because of this sharing of load between the left and right telescoping struts.

In the event that a vehicle equipped with a stabilizer bar system according to the invention strikes an obstacle equally with both road wheels, thrust forces of equal magnitude will arise between the stabilizer bar and the telescoping struts on either side of the vehicle. As a result, a concomitant abatement of friction within both struts will occur.

It should be understood from this disclosure that a stabilizer bar according to the present invention reacts not only to torsional forces but also to bending forces imposed upon the combination torsional and bending reaction segment by the crank arms.

Although the present invention is illustrated with non-steered wheels, those skilled in the art will appreciate in view of this disclosure that a stabilizer bar system according to the present invention could be employed with steerable wheels by providing a suitable bearing means 28 for attaching a stabilizer bar to telescoping struts 14. These and all other modifications of the present invention are possible without departing from the spirit in scope of the invention as defined by the appended claims.

I claim:

1. A friction reducing suspension stabilizer bar and attachment means for a vehicle with telescoping struts, comprising:
   a combination torsional and bending reaction segment running generally transversely across said vehicle and pivotally mounted to the chassis of said vehicle;
   left and right crank arms, with each having a first end attached to said torsional and bending reaction segment and a second end adapted to be attached to a telescoping strut; and
   bearing means for attaching each of said second ends to a telescoping strut such that said torsional and bending reaction segment will react to both torsional loading resulting from jounce and rebound movement of the suspension and to bending loads resulting from transversely directed forces imposed upon said second ends of said crank arms by said telescoping struts.

2. A suspension stabilizer bar according to claim 1 wherein said torsional and bending reaction segment and said crank arms comprise a unitary structure.

3. A suspension stabilizer bar according to claim 1 wherein said bearing means each comprise a combination thrust and rotational bearing adapted for receiving one of said second ends of said crank arms.

4. A suspension stabilizer bar according to claim 1 wherein each of said bearing means is adapted to connect one of said second ends to an inboard portion of a telescoping suspension strut.

5. A suspension stabilizer bar according to claim 4 wherein each of said bearing means comprises a ball and socket joint.

6. A suspension stabilizer bar according to claim 5 wherein each of said second ends of said crank arms is attached to the ball portion of one of said joints.

7. A suspension for an automotive vehicle comprising:
   left and right telescoping struts mounted at the upper ends thereof to the chassis of said vehicle and having provisions for rotatably mounting road wheels thereto; and
   a friction reducing stabilizer bar, comprising:
      a combination torsional and bending reaction segment running generally transversely across said vehicle and pivotally mounted to the chassis of said vehicle;
      left and right crank arms, with each having a first end attached to said torsional and bending reaction segment and a second end adapted for attachment to one of said telescoping struts; and
      bearing means for attaching each of said second ends to one of said telescoping struts such that said torsional and bending reaction segment will react to both torsional loading resulting from jounce and rebound movement of the suspension and to bending loads resulting from transversely directed forces imposed upon said second ends of said crank arms by said telescoping struts.

8. A suspension stabilizer bar according to claim 7 wherein said torsional and bending reaction segment and said crank arms comprise a unitary structure.

9. A suspension stabilizer bar according to claim 7 wherein each of said bearing means comprises a combination thrust and rotational bearing for receiving one of said second ends of said stabilizer bar and for attaching said stabilizer bar end to one of said telescoping struts.

10. A suspension stabilizer bar according to claim 7 wherein each of said bearing means connects one of said second ends to an inboard portion of one of said telescoping suspension struts.

11. A suspension stabilizer bar according to claim 10 wherein said bearing means comprises a ball and socket joint.

12. A suspension for the non-steered wheels of an automotive vehicle comprising:
   left and right telescoping struts mounted at the upper ends thereof to the chassis of said vehicle and having provisions for rotatably mounting road wheels thereto; and
   a friction reducing stabilizer bar, comprising:
      a combination torsional and bending reaction segment running generally transversely across said vehicle and pivotally mounted to the chassis of said vehicle;
      left and right crank arms, with each having a first end attached to said torsional and bending reaction segment and a second end adapted for attachment to one of said telescoping struts; and
      bearing means for attaching each of said second ends one of said telescoping struts such that said torsional and bending reaction segment will react to both torsional loading resulting from jounce and rebound movement of the suspension and to bending loads resulting from transversely directed forces imposed upon said second ends of said crank arms by said telescoping struts.

13. A suspension stabilizer bar according to claim 12 wherein said second ends of said crank arms each comprise a stub section extending generally perpendicular to the remainder of said crank arm and generally parallel to said combination torsional and bending reaction segment.

14. A suspension stabilizer bar according to claim 12 wherein each of said stub sections is engaged with one of said bearing means.

* * * * *